Figure 1:
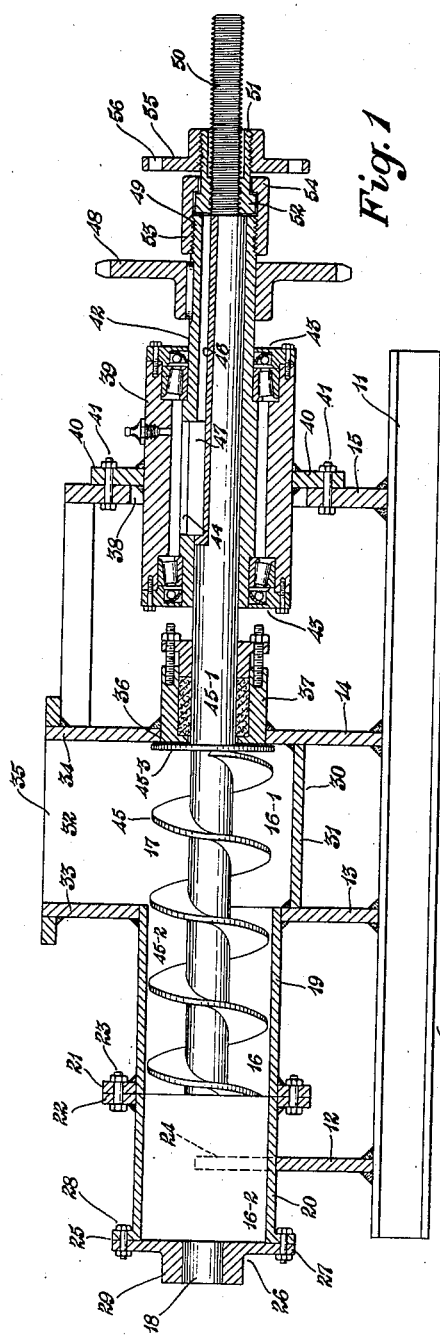

June 12, 1951 — E. A. HAWK — 2,556,392
SCREW CONVEYER APPARATUS
Filed Jan. 29, 1948

Inventor
*Elwin A. Hawk*
By *Fress and Bishop*
Attorneys

Patented June 12, 1951

2,556,392

UNITED STATES PATENT OFFICE 2,556,392

SCREW CONVEYER APPARATUS

Elwin A. Hawk, East Rochester, Ohio

Application January 29, 1948, Serial No. 5,082

5 Claims. (Cl. 198—214)

The invention relates generally to screw conveyor apparatus and more particularly to screw conveyor apparatus used in the ceramic industry and frequently termed auger machines, and used for conveying or conveying and pressing plastic ceramic material in the manufacture of various classes of ceramic products such as the following: heavy ceramic products including brick, tile and the like; pottery including dinnerware and the like; and porcelain including electrical insulators and the like.

In the manufacture of ceramic products different ceramic bodies each having a different composition of ceramic materials are used from time to time in the same production line, and each particular ceramic body usually has a different resistance to the conveying or feeding action of any particular auger machine. On the other hand, in processing a particular ceramic body, its moisture content may change during preceding operations causing a change in its resistance to the auger conveying or feeding. It is desirable that the output of an auger machine, or of a screw conveyor apparatus which constitutes a component part of another machine or apparatus, be as nearly constant as possible, so that the output of the production line or the machine or apparatus of which the auger machine or screw conveyor apparatus is a part may be maintained as nearly constant as possible.

In usual auger machines or screw conveyor apparatus, either due to changes in the compositions of successive ceramic bodies constituting the input, or due to variations in the moisture content of a ceramic body having a particular composition and constituting the input, a variable output of the auger machine or screw conveyor apparatus is very frequently experienced.

While an auger machine or a screw conveyor apparatus frequently performs a pressing operation on the material conveyed therethrough, the present invention is more particularly directed to controlling the flow of material through an auger machine or a screw conveyor apparatus, and the words "screw conveyor apparatus," when used alone hereinafter throughout this specification including the claims, are intended to include an auger machine or a screw conveyor apparatus in which material is pressed as well as conveyed.

The objects of the present invention include the provision of improved screw conveyor apparatus which is adapted for having a variable material input and flow therethrough so as to maintain the material output as nearly constant as possible.

Further objects of the present invention include the provision of such variable screw conveyor apparatus, in which the parts are of simplified construction and arrangement, whereby the parts may be rapidly and economically manufactured, and easily and correctly assembled and disassembled, so that the apparatus may be economically produced and maintained.

The foregoing and other objects are attained by the screw conveyor apparatus, parts, combinations, and sub-combinations, which comprise the present invention and the nature of which is set forth in the following general statement, and preferred embodiments of which are set forth in the following description, and which are particularly and distinctly pointed out and set forth in the appended claims forming part hereof.

The nature of the improved screw conveyor apparatus of the present invention may be stated in general terms as including screw housing walls forming and having formed therein an elongated chamber having an inlet end with an inlet opening and an outlet end with an outlet opening. An elongated screw is mounted for rotation and lengthwise movement and includes a screw shaft and screw blade means on the screw shaft, the screw blade means and a portion of the screw shaft being located in the chamber and the screw blade means terminating at one end in the inlet end of the chamber adjacent the inlet opening. Adjusting means are provided for moving the screw lengthwise to any desired position of the adjacent end of the screw blade means with respect to the inlet opening of the chamber, and the adjusting means are preferably associated with rotary drive means for the screw shaft.

Figure 2:
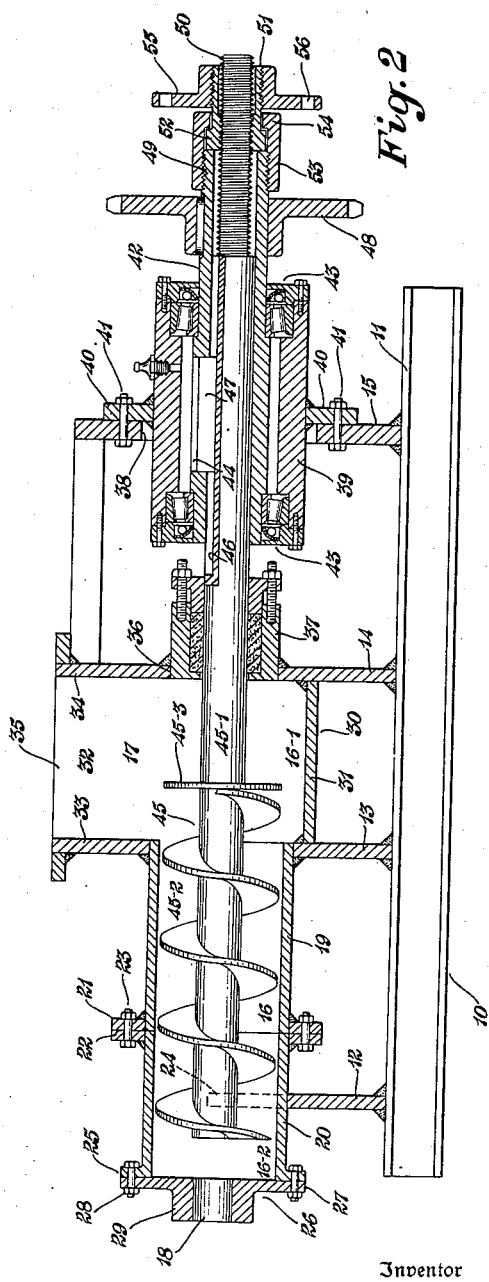

By way of example, preferred embodiments of the improved screw conveyor apparatus and of improved parts thereof are illustrated in the accompanying drawing forming part hereof in which Figure 1 is a longitudinal vertical section of one embodiment of the improved screw conveyor apparatus in the form of an extrusion press, the parts being shown in one position of adjustment for providing one rate of material input for the apparatus; and Fig. 2 is a similar view showing the parts in another position of adjustment for another rate of material input for the apparatus.

Similar numerals refer to similar parts throughout the drawings.

One embodiment of the improved screw conveyor apparatus of the present invention in the form of an extrusion press is indicated generally by 10, and includes a base frame 11 from which extend upwardly a plurality of longitudinally spaced laterally extending vertical plate walls 12, 13, 14, and 15. The outer plate walls 12 and 15 serve as supports for other parts of the apparatus, and the intermediate plate walls 13 and 14 serve as supports for and wall portions of other parts of the apparatus.

The improved screw conveyor apparatus 10 furthermore includes, together with the plate walls 13 and 14, other walls forming and having formed therein an elongated chamber indicated generally by 16 and having an inlet end 16—1 with an upper inlet opening 17 and an outlet end 16—2 with a reduced outlet extrusion die opening 18. The other screw housing walls include as shown coaxial equal diameter cylindric tubular walls 19 and 20 having adjacent ends abutting each other intermediate the inlet and outlet ends of the chamber, the abutting end of the tubular wall 19 being provided with an outwardly extending annular flange 21 and the abutting end of the tubular wall 20 being provided with an outwardly extending flange 22, and the flanges 21 and 22 being seal connected with each other by usual means including bolt and nut sets 23.

The plate wall 13 has formed therein a circular opening in which fits the inlet end extremity of the tubular wall 19, and there is a sealing weld connection between the tubular wall 19 and the transverse plate wall 13.

The transverse plate 12 has its upper end formed as an upwardly opening semi-circular yoke 24 in which rests the tubular wall 20. The outlet extremity of the tubular wall 20 is provided with an outwardly extending annular flange 25, and an extrusion die 26 includes an annular disk portion 27, outer peripheral portions of which abut the flange 25, and are seal connected thereto by usual means including bolt and nut sets 28. The extrusion die 26 furthermore as shown includes a cylindric nozzle 29 extending outwardly from the annular disk 27 and having formed therein the extrusion die outlet opening 18.

Between the longitudinally spaced plate walls 13 and 14 there is located an upwardly opening U-wall indicated generally by 30 and including a lower upwardly opening semi-cylindric portion 31 whose curvature as shown is coaxial with and somewhat larger than the curvature of the tubular wall 19; and extending from the upper ends of the semi-cylindric portion 31, the U-wall 30 includes side wall portions 32 which form with upper portions 33 and 34 of the plate walls 13 and 14, respectively, an upwardly opening rectangular hopper 35.

The plate wall 14 has formed therein a circular opening 36 which is coaxial with the tubular walls 19 and 20, and a stuffing box indicated generally by 37 of usual construction has one end fitting in the opening 36 and seal weld connected with the plate wall 14.

The transverse plate wall 15 has formed therein a circular opening 38 which is coaxial with the circular opening 36 in the plate wall 14 and the tubular walls 19 and 20. An elongated tubular bearing housing 39 extends through the opening 38 of the plate wall 15, and the bearing housing 39 is provided intermediate its ends with an outwardly extending annular flange 40 which abuts the plate wall 15 and is secured thereto by nut and bolt sets 41. A drive tube 42 extends with clearance through the opening of the bearing mounting tube 39, and at each end of the bearing housing 39 there is interposed between the bearing housing 39 and the drive tube 42 and mounted in a usual manner a tapered roller bearing indicated generally by 43, the two tapered roller bearings 43 being arranged in a usual manner for resisting radial and oppositely directed thrust loads.

The drive tube 42 has formed therein intermediate its ends, a key slot 44 which is located between the roller bearings 43 and within the opening of the housing 39. The drive tube 42 has a cylindric bore coaxial with the opening of the stuffing box 37 and with the cylindric tubular walls 19 and 20.

The improved conveyor apparatus 10 furthermore includes a screw indicated generally by 45 and including a screw shaft 45—1 on which is externally mounted a continuous thin walled helical screw blade 45—2. When desired separate screw blades may be mounted on the shaft 45—1. The screw blade 45—2 and a cantilever end portion of the shaft 45—1 are located within the chamber 16, and as shown the longitudinal axis of the screw shaft 45—1 and the screw blade 45—2 thereon is coaxial with the tubular walls 19 and 20. The screw blade 45—2 terminates in the inlet end 16—1 of the chamber 16, and there is preferably provided as shown on the screw shaft 45—1, an outwardly extending annular disk flange 45—3 abutting the inlet end of the screw blade 45—2.

The screw shaft 45—1 is cylindric and extends through the central opening of the stuffing box 37 and through the cylindric bore of the drive tube 42, the cylindric shaft 45—1 and the cylindric bore of the drive tube 42 slidably fitting each other. The cylindric shaft 45—1 has formed therein a longitudinally extending key way 46 which registers with the key slot 44 in the drive tube 42, and a longitudinally extending key 47 located in the key slot 44 and the key way 46 provides a driving connection between the drive tube 42 and the screw shaft 45—1 and permits sliding of the shaft 45—1 in the drive tube 42.

The drive tube 42 extends beyond the outer end of the bearing housing 39, and a drive sprocket 48 is secured on the outer end of the drive tube 42 adjacent the bearing housing 39. Beyond the drive sprocket 48, the outer extremity 49 of the drive tube 42 has formed thereon external threads.

The outer end of the screw shaft 45—1 extends beyond the outer extremity of the drive tube 42 and has a reduced externally threaded portion 50 on which is screwed an adjusting sleeve nut 51. The inner end of the sleeve nut 51 has an outwardly extending annular bearing and retaining flange 52 formed thereon, and a bearing and retaining sleeve 53 has internal threads at one end screwed on the external threads of the outer extremity 49 of the drive tube 42. The bearing and retaining sleeve 53 also has an inwardly extending annular bearing and retaining flange 54 overlapping the flange 52 of the adjusting sleeve nut 51. The adjusting sleeve nut 51 is thus retained and journaled on the drive tube 42. The outer end of the adjusting sleeve nut 51 extends beyond the outer end of its retaining sleeve 53, and an adjusting wheel 55 is secured on the outer end of the adjusting sleeve nut 51, and as shown the adjusting wheel 55 has formed therein a plurality of spanner wrench holes 56.

The improved screw conveyor apparatus 11 as thus described is used to provide a variable input of material into the inlet end of the screw chamber 16, so that a desired output of material flows out of the outlet end of the screw chamber 16. In the case of plastic ceramic material, the improved apparatus 10 may be adjusted so that any particular body mixture of plastic ceramic material may have an adjustable rate of input to the screw chamber 16 which provides for a desired substantially constant rate of output from the outlet extrusion die opening 18.

In Fig. 1, the parts of the improved apparatus are shown in their relative positions, when adjusted so that the maximum number of turns of the screw blade 45—2 extend in the direction of the plate wall 14 beyond the inlet end of the tubular wall 19 and below the inlet opening 17 of the screw chamber 16 and the upwardly opening hopper 35. In this position of adjustment, when the hopper 35 and the inlet end portion 16—1 of the chamber 16 below the hopper 35 are filled with material, each turn of the screw 45 picks up a maximum bite of the material by the turns of the screw plate 45—2 extending beyond the inlet end of the tubular wall 19 in the inlet end 16—1 of the hopper 35.

In Fig. 2 the parts of the improved apparatus are shown in their relative positions when the screw shaft 45—1 has been adjusted to its extreme position towards the outlet extrusion die opening 18, and with only a fraction of a turn of the screw blade 45—2 located in the direction of the plate wall 14 beyond the inlet end of the tubular wall 19 in the inlet end 16—1 of the chamber below the inlet opening 17 and the hopper 35, and in which position each turn of the screw 45 picks up a much smaller bite of material when the apparatus is loaded, as compared with the adjustment of the parts shown in Fig. 1.

Adjustments of the parts between the extreme positions shown in Figs. 1 and 2 provide for any desired intermediate size of bite of input material for each rotation of the screw 45. The adjustment of the parts is effected by turning the adjusting sleeve nut 51, and thereby slidably advancing or retracting the screw shaft 45—1 in the drive tube 42. The drive tube 42 as above stated is drive connected with the screw shaft 45—1, as above described by means of the key 47 fitting in the key slot 44 and the key way 46. The drive sprocket 48 for the drive tube 42 has a driving connection not shown with any usual reduction gearing and motor.

The embodiments of the present invention illustrated and described herein are by way of example, and the scope of the present invention is not limited to the same or to the particular details thereof but is commensurate with any and all novel subject matter contained herein which may at any time properly under the patent laws be set forth in the claims hereof or originating herein, and the elements of any such claims are intended to include their reasonable equivalents.

I claim:

1. In screw conveyor apparatus for plastic material, screw housing walls forming and having formed therein an elongated chamber having an inlet end with an inlet opening and an outlet end with an outlet opening, an elongated screw mounted for rotation and lengthwise movement, the screw including a screw shaft and screw blade means on the screw shaft, the screw blade means and a portion of the screw shaft being located in the chamber and the screw blade means terminating at one end in the inlet end of the chamber and the screw blade means and the shaft terminating at the other end adjacent the outlet opening, and the screw shaft extending through and outside of one of the chamber walls, and drive means in rotatable and longitudinally slidable connection with the screw shaft outside of the chamber walls, the drive means including a drive tube having a bore, the screw shaft extending through the bore, the drive tube having a key slot formed therein and the screw shaft having a longitudinally extending key way formed therein and the key way being substantially longer than the key slot, and a key located in the key slot and the key way.

2. In screw conveyor apparatus for plastic material, screw housing walls forming and having formed therein an elongated chamber having an inlet end with an inlet opening and an outlet end with an outlet opening, an elongated screw mounted for rotation and lengthwise movement, the screw including a screw shaft and screw blade means on the screw shaft, the screw blade means and a portion of the screw shaft being located in the chamber and the screw blade means terminating at one end in the inlet end of the chamber and the screw blade means and the shaft terminating at the other end adjacent the outlet opening, and the screw shaft extending through and outside of one of the chamber walls, and drive means in rotatable and longitudinally slidable connection with the screw shaft outside of the chamber walls, the drive means including a drive tube having a bore, the screw shaft extending through the bore, the drive tube having a key slot formed therein and the screw shaft having a longitudinally extending key way formed therein and the key way being substantially longer than the key slot, and a key located in the key slot and the key way, and means for adjustably positioning the screw shaft lengthwise with respect to the drive tube.

3. In screw conveyor apparatus for plastic material, screw housing walls forming and having formed therein an elongated chamber having an inlet end with an inlet opening and an outlet end with an outlet opening, an elongated screw mounted for rotation and lengthwise movement, the screw including a screw shaft and screw blade means on the screw shaft, the screw blade means and a portion of the screw shaft being located in the chamber and the screw blade means terminating at one end in the inlet end of the chamber and the screw blade means and the shaft terminating at the other end adjacent the outlet opening, and the screw shaft extending through and outside of one of the chamber walls, and drive means in rotatable and longitudinally slidable connection with the screw shaft outside of the chamber walls, the drive means including a drive tube having a bore, the screw shaft extending through the bore, the drive tube having a key slot formed therein and the screw shaft having a longitudinally extending key way formed therein and the key way being substantially longer than the key slot, and a key located in the key slot and the key way, and means for adjustably positioning the screw shaft lengthwise with respect to the drive tube, the adjusting means including screw threads on the screw shaft and an adjusting sleeve nut journaled on the drive sleeve.

4. In screw conveyor apparatus for plastic material, screw housing walls forming and having formed therein an elongated chamber having an inlet end with an inlet opening and an outlet end with an outlet opening, an elongated screw mounted for rotation and lengthwise movement, the screw including a screw shaft and screw blade means on the screw shaft, the screw blade means and a portion of the screw shaft being located in the chamber and the screw blade means terminating at one end in the inlet end of the chamber and the screw blade means and the shaft terminating at the other end adjacent the outlet opening, and the screw shaft extending through and outside of one of the chamber walls, and drive means in rotatable and longitudinally slidable connection with the screw shaft outside of the chamber walls, the drive means including a drive tube having a bore, the screw shaft extending through the bore, the drive tube having a key slot formed therein and the screw shaft having a longitudinally extending key way formed therein and the key way being substantially longer than the key slot, and a key located in the key slot and the key way, and means for adjustably positioning the screw shaft lengthwise with respect to the drive tube, and opposed thrust bearing means rotatably mounting the drive tube.

5. In screw conveyor apparatus for plastic material, screw housing walls forming and having formed therein an elongated chamber having an inlet end with an inlet opening and an outlet end with an outlet opening, an elongated screw mounted for rotation and lengthwise movement, the screw including a screw shaft and screw blade means on the screw shaft, the screw blade means and a portion of the screw shaft being located in the chamber and the screw blade means terminating at one end in the inlet end of the chamber and the screw blade means and the shaft terminating at the other end adjacent the outlet opening, and the screw shaft extending through and outside of one of the chamber walls, and drive means in rotatable and longitudinally slidable connection with the screw shaft outside of the chamber walls, the drive means including a drive tube having a bore, the screw shaft extending through the bore, the drive tube having a key slot formed therein and the screw shaft having a longitudinally extending key way formed therein and the key way being substantially longer than the key slot, and a key located in the key slot and the key way, and means for adjustably positioning the screw shaft lengthwise with respect to the drive tube, the adjusting means including screw threads on the screw shaft and an adjusting sleeve nut journaled on the drive sleeve, and opposed thrust bearing means rotatably mounting the drive tube.

ELWIN A. HAWK.

REFERENCES CITED

The following references are of record in the file of this patent:

UNITED STATES PATENTS

| Number | Name | Date |
|---|---|---|
| 613,748 | Wilson | Nov. 8, 1898 |
| 1,177,792 | Mims | Apr. 4, 1916 |
| 1,376,084 | Dyer | Apr. 26, 1921 |
| 1,423,371 | Vierow | July 18, 1922 |
| 2,060,569 | Greenlaw | Nov. 10, 1936 |
| 2,228,840 | Mittendorf | Jan. 14, 1941 |